(12) United States Patent
Kaelberer (10) Patent No.: US 11,313,672 B2
(45) Date of Patent: Apr. 26, 2022

(54) OPTICAL POSITION-MEASURING DEVICE

(71) Applicant: DR. JOHANNES HEIDENHAIN GmbH, Traunreut (DE)

(72) Inventor: Thomas Kaelberer, Schrobenhausen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 141 days.

(21) Appl. No.: 16/869,606

(22) Filed: May 8, 2020

(65) Prior Publication Data

US 2020/0363193 A1 Nov. 19, 2020

(30) Foreign Application Priority Data

May 14, 2019 (DE) ...................... 10 2019 206 937.1

(51) Int. Cl.
*G01B 11/14* (2006.01)
*G01D 5/38* (2006.01)
(Continued)

(52) U.S. Cl.
CPC ............. *G01B 11/14* (2013.01); *G01D 5/344* (2013.01); *G01D 5/38* (2013.01); *G02B 27/10* (2013.01);
(Continued)

(58) Field of Classification Search
CPC .. G02B 5/1861; G02B 5/1866; G02B 5/1871; G02B 27/10; G02B 27/1006;
(Continued)

(56) References Cited

U.S. PATENT DOCUMENTS 5,333,048 A 7/1994 Michel et al.
6,445,456 B2 * 9/2002 Speckbacher ............ G01D 5/38
250/237 G
(Continued)

FOREIGN PATENT DOCUMENTS

DE 102010063253 A1 6/2012
DE 102014211004 A1 12/2015
(Continued)

*Primary Examiner* — Gordon J Stock, Jr.
(74) *Attorney, Agent, or Firm* — Leydig, Voit & Mayer, Ltd.

(57) ABSTRACT

An optical position-measuring device for sensing a relative position of two objects, each object being connected to a grating. The optical position-measuring device is configured such that, at one of the gratings, an illumination beam emitted from a light source is split into two sub-beams which, in respective scanning beam paths following the splitting, experience different polarization-optical effects and recombine at one of the gratings. After the differently polarized sub-beams are recombined, a plurality of phase-shifted, displacement-dependent scanning signals are generatable from a resulting signal beam in a detection unit. No separate polarization-optical components are disposed in the scanning beam paths of the sub-beams between splitting and recombination. At least one of the gratings is configured as a polarization grating configured to produce the different polarization-optical effects and such that diffraction orders with different polarization states are produced at each point of incidence on the polarization grating.

32 Claims, 6 Drawing Sheets

(51) Int. Cl.
*G01D 5/34* (2006.01)
*G02B 27/10* (2006.01)
*G02B 27/28* (2006.01)

(52) U.S. Cl.
CPC ........ *G02B 27/283* (2013.01); *G02B 27/1006* (2013.01)

(58) Field of Classification Search
CPC .............. G02B 27/283; G02B 27/4261; G02B 26/106; G01B 11/00; G01B 11/002; G01B 11/005; G01B 11/02; G01B 11/14; G01D 5/32; G01D 5/34; G01D 5/341; G01D 5/342; G01D 5/344; G01D 5/345; G01D 5/347; G01D 5/34707; G01D 5/34715; G01D 5/3473; G01D 5/34738; G01D 5/34746; G01D 5/34753; G01D 5/34761; G01D 5/34769; G01D 5/34776; G01D 5/34784; G01D 5/34792; G01D 5/34794; G01D 5/38

See application file for complete search history.

(56) References Cited

U.S. PATENT DOCUMENTS

| | | | |
|---|---|---|---|
| 7,404,259 B2* | 7/2008 | Hermann | G01D 5/38 33/707 |
| 7,796,272 B2 | 9/2010 | Holzapfel | |
| 8,994,958 B2 | 3/2015 | Holzapfel | |
| 9,080,857 B2* | 7/2015 | Huber | G01D 5/34746 |
| 9,733,068 B2 | 8/2017 | Drescher et al. | |
| 9,766,098 B2* | 9/2017 | Holzapfel | G01D 5/3473 |
| 2001/0006421 A1* | 7/2001 | Parriaux | G01D 5/38 356/499 |
| 2012/0105962 A1* | 5/2012 | Fattal | G02B 5/1819 359/575 |
| 2012/0154805 A1* | 6/2012 | Holzapfel | G01D 5/38 356/365 |
| 2012/0162646 A1* | 6/2012 | Holzapfel | G01D 5/38 356/369 |
| 2021/0088707 A1* | 3/2021 | Kawashima | G02B 1/005 |
| 2021/0255008 A1* | 8/2021 | Kaelberer | G01D 5/38 |

FOREIGN PATENT DOCUMENTS

| | | | |
|---|---|---|---|
| EP | 0481356 A2 | 4/1992 | |
| EP | 2450682 A2 | 5/2012 | |
| WO | WO-9533179 A1 * | 12/1995 | ............ G01D 5/38 |
| WO | WO 2008138501 A1 | 11/2008 | |

* cited by examiner

FIG. 1

Prior Art

OPTICAL POSITION-MEASURING DEVICE

CROSS-REFERENCE TO PRIOR APPLICATIONS

Priority is claimed to German Patent Application No. DE 10 2019 206 937.1, filed on May 14, 2019, the entire disclosure of which is hereby incorporated by reference herein.

FIELD

The present invention relates to an optical position-measuring device suitable for determining the relative position of two objects that are movable relative to one another.

BACKGROUND

Besides intensity-based analysis techniques, known high-precision optical position-measuring devices also use polarization-optical methods to generate three or more phase-shifted, displacement-dependent scanning signals for position determination. With regard to polarization-optical generation of scanning signals, reference is made to the Applicant's European Patent Application EP 0 481 356 A2, for example.

Figure 1:
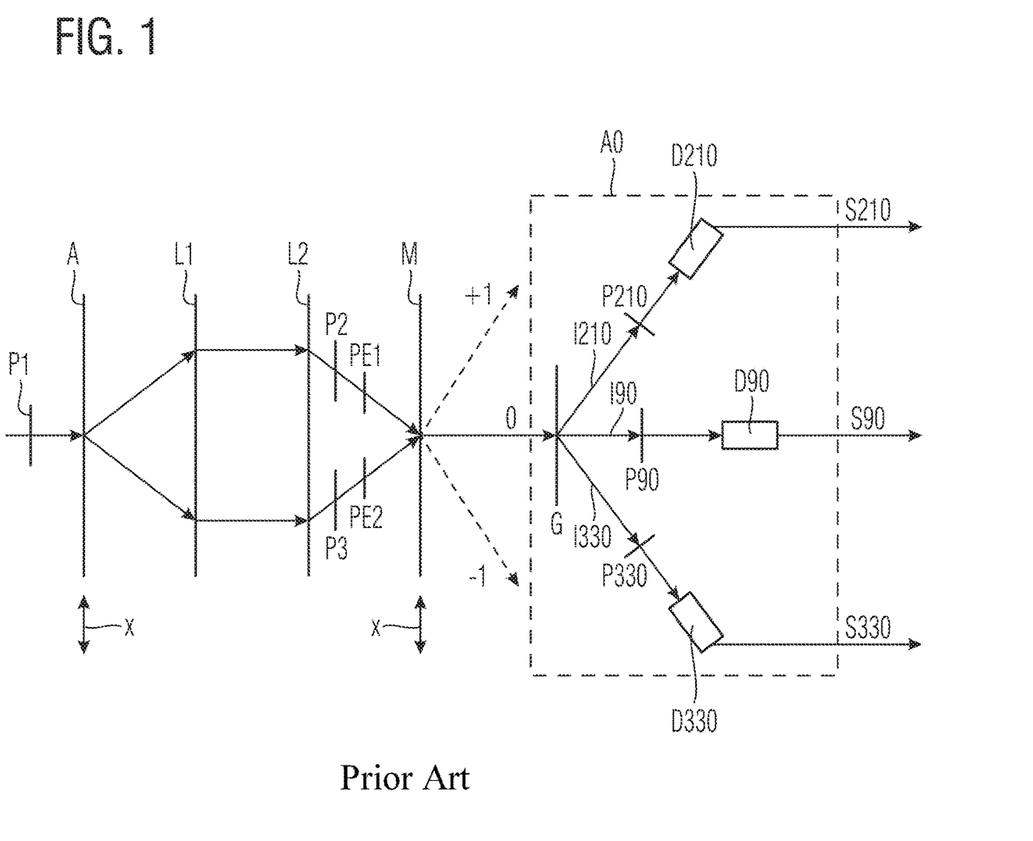
FIG. 1 is a schematic view of an optical position-measuring device according to the prior art.

The principle underlying the signal generation in accordance with EP 0 481 356 A2 is shown in FIG. 1 in a schematic illustration of the unfolded scanning beam path. Gratings A, M are disposed such that they are movable together relative to the other components L1, L2, AO along the indicated measurement direction x. The beam incident from the left, which is polarized by polarizer P1 in a defined manner, is initially split by grating A into two sub-beams. As can be seen from FIG. 1, separate polarization-optical components, such as differently oriented quarter-wave plates PE1, PE2, for example, are placed in the beam path of the sub-beams which are to be interfered and in which the position information is encoded. Quarter-wave plates PE1, PE2 polarize the two sub-beams orthogonally to each other as they pass therethrough, whereupon the two sub-beams are left- and right-circularly polarized, for example. These two sub-beams are subsequently superimposed to form a combined signal beam (0) and split into three or more superimposed sub-beams I90, I210, I330 in a downstream detection unit or optical analyzer AO. After the sub-beams have passed through differently oriented polarizers P 90, P 210, P 330 of different orientations, detector elements D 90, D 210, D 330 ultimately produce scanning signals S 90, S 210, S 330 which are phase-shifted by 120° relative to each other and can be further processed in a known manner. Besides quarter-wave plates PE1, PE2, additional polarization-optical components in the form of polarizers P 2, P 3 are often placed in the beam paths of the split sub-beams in order to compensate for spurious polarizations caused by gratings A, L1, L2 through which the sub-beams passed earlier.

Such polarization-optical generation of a plurality of phase-shifted, displacement-dependent scanning signals has the disadvantage of requiring separate or additional optical elements, such as quarter-wave plates and polarizers, to be placed in the scanning beam path or in the scanning gap between the components that are moved relative to each other. If the space available for the respective optical position-measuring device is limited, or if a small scanning distance is provided, such additional components may be problematic. If the position measuring device is to be designed analogously to the principles described in WO 2008/138501 A1, the components A, M and L1, L2 shown in FIG. 1 take the form of two scales which are displaceable relative to each other. In this case, it is frequently not possible to mechanically fix interposed stationary polarization-optical components.

The additional polarization optical components in the scanning beam path also impose increased requirements on the flatness, parallelism and homogeneity of the support structures used. Required are drift-free and stable mounting surfaces for holding these support structures. In this connection, possible material defects can only be compensated for at the expense of very high complexity using appropriate calibration procedures. This is true, in particular, if long, translation-invariant scales are used in such optical position-measuring devices.

Other system properties, such as natural frequencies or airflows in the scanning gap, may also be negatively affected by additionally required polarization-optical components in the scanning beam paths.

An optical position-measuring device where polarization-optical generation of phase-shifted scanning signals is accomplished without separate or additional polarization-optical components in the scanning beam paths has already been described in the Applicant's German Patent Application DE 10 2010 063 253 A1. In accordance with this approach, the required polarization-optical components are integrated into other components of the scanning beam path, e.g., in the form of high-frequency gratings having periodically varying structures. The components used in such a position-measuring device exhibit position-dependent polarization properties in the measurement direction. For example, it may be provided that the scale functions as a polarization grating. In this case, the scale is composed, for example, of a plurality of locally variable layers and includes a high-frequency grating having a period of $d_R < \lambda/2$, which has only a zeroth diffraction order and provides the polarization-optical functionality. The grating orientation of the high-frequency grating varies along the measurement direction with the polarization period $d_P$, which must be significantly greater than the width $hw_{Spot}$ of the illuminated region of the scale, which represents the lower limit of the signal period SP of the generatable scanning signals. This means that the relation $d_P > hw_{Spot}$ must be satisfied. Thus, the sub-beams incident at different points on the scale experience locally different polarization-optical effects. In this connection, the variation in polarization must be adjusted exactly to the particular scanning distance. To this end, the distance between the points of incidence of the sub-beams is selected to be equal to half the grating period of the scale. A change in the scanning distance results in a reduction of the modulation depth of the scanning signals and in changes in other signal characteristics.

Finally, another optical position-measuring device where polarization-optical generation of phase-shifted scanning signals is accomplished without additional discrete polarization-optical components in the scanning beam paths has already been described in the Applicant's German Patent Application DE 10 2014 211 004 A1. In accordance with this publication, the diffraction at gratings on the side of the scale or on the side of the scanning reticle of an optical position-measuring device can be used under certain conditions to generate certain polarization states in the diffracted sub-beams, such as opposite circular polarization states. However, for this purpose, certain incidence conditions must be met for the beam to be split on the one hand, and, on the other hand, the respective grating used to generate desired polarization properties in the diffracted sub-beams must have a very small grating period. Consequently, this method of producing polarization-optical effects on the sub-beams has certain limitations and cannot be used for all scanning principles.

SUMMARY

In an embodiment, the present invention provides an optical position-measuring device for sensing a relative position of two objects which are movable relative to one another along at least one measurement direction. The optical position-measuring device includes a first grating configured to be connected to the first object and a second grating configured to be connected to the second object. The optical position-measuring device is configured such that, at one of the gratings, an illumination beam emitted from a light source is split into at least two sub-beams which, in respective scanning beam paths following the splitting, experience different polarization-optical effects and recombine at one of the gratings. After the differently polarized sub-beams are recombined, a plurality of phase-shifted, displacement-dependent scanning signals are generatable from a resulting signal beam in a detection unit. No separate polarization-optical components are disposed in the scanning beam paths of the at least two sub-beams between splitting and recombination. At least one of the gratings is configured as a polarization grating configured to produce the different polarization-optical effects on the at least two sub-beams. The polarization grating is configured such that diffraction orders with different polarization states are produced at each point of incidence on the polarization grating.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 6b is a detail view of the polarization grating of FIG. 6a;

FIG. 6c is a partial cross-sectional view of the polarization grating of FIG. 6a.

DETAILED DESCRIPTION

In an embodiment, the present invention provides an optical position-measuring device which does not require additional polarization-optical components in the scanning beam path for polarization-optical generation of phase-shifted scanning signals and which allows the use of different optical scanning principles. The polarization states generated in the various sub-beams should, to the extent possible, remain unchanged even under varying scanning conditions so as to ensure constant quality of the scanning signals.

The optical position-measuring device according to an embodiment of the invention serves to sense the relative position of two objects which are movable relative to one another along at least one measurement direction and which are connected to a first grating and a second grating. At one grating, an illumination beam emitted from a light source is split into at least two sub-beams. In the further scanning beam path, the sub-beams experience different polarization-optical effects. After recombining the differently polarized sub-beams at a grating, a plurality of phase-shifted, displacement-dependent scanning signals can be generated from the resulting signal beam in a detection unit. No separate polarization-optical components are disposed in the scanning beam paths of the sub-beams between splitting and recombination. At least one of the traversed gratings is configured as a polarization grating for producing the different polarization-optical effects on the sub-beams. The polarization grating is configured such that diffraction orders with different polarization states are produced at each point of incidence on the grating.

It may be provided that the polarization grating include a plurality of arcuately curved grating structures in the form of grating lines and grating spaces, the direction of longitudinal extent of each of these grating structures being oriented parallel to the measurement direction, and the grating structures being arranged periodically both along the measurement direction and perpendicularly to the measurement direction.

Furthermore, the polarization grating may have strip-shaped grating sections periodically arranged parallel to the measurement direction with a periodicity in the measurement direction, the direction of longitudinal extent of the grating sections being oriented perpendicularly to the measurement direction, the grating structures within the grating sections being periodically arranged perpendicularly to the measurement direction with an orthogonal periodicity.

Moreover, between adjacent grating sections of the polarization grating, there may be disposed:

a grating space, or a grating line, or a plurality of alternating adjacent grating lines and grating spaces.

Alternatively, grating structures of adjacent grating sections may adjoin one another.

In an advantageous embodiment, orthogonal periodicity $\Lambda\_ortho$ may be selected according to the relation $\Lambda\_ortho < 1.5 \cdot \lambda$, where $\lambda$ is the wavelength of the light source used.

It may also be provided that the area fill ratio FV of the polarization grating be selected according to the relation $FV < 0.6$, where the area fill ratio FV is defined as the ratio of the area of the grating lines within a polarization grating unit cell to the overall area of the polarization grating unit cell.

It is also possible that the polarization grating may be configured as a reflection phase grating whose grating lines and grating spaces have different reflective properties.

In a preferred embodiment, the reflection phase grating may include at least the following components:
a carrier substrate,
a planar reflective layer disposed on the carrier substrate,
a grating structure layer disposed above the reflective layer.

The grating structure layer may have a layer thickness d selected according to the relation $d<0.6\cdot\lambda$, where $\lambda$ is the wavelength of the light source used.

Furthermore, it may be provided that a planar phase-shifting layer be disposed between the planar reflective layer and the grating structure layer.

It is also possible according to an embodiment that:
the reflective layer is composed of a metallic reflective layer or of a reflective layer stack, and
the grating structure layer is composed of a dielectric material from the group consisting of $SiO_2$, $TaO_x$, $TiO_2$, Si, or of a semiconductor material from the group consisting of TiN, GaN, or of a layer stack including one more of the aforementioned dielectric materials and one more of the aforementioned semiconductor materials.

Advantageously, the polarization grating is configured such that resulting $+/-1^{st}$ diffraction orders are polarized orthogonally to each other.

Another embodiment of the inventive optical position-measuring device provides that:
a first object be connected to a first grating which is configured as a reflection phase grating or transmission phase grating,
a second object be connected to a second grating which functions as a polarization grating and is configured as a reflection phase grating,
a beam emitted from the light source being split at the first grating into two sub-beams,
the sub-beams subsequently striking the second grating, where each of the two sub-beams experiences diffraction and a change in direction, and the sub-beams being polarized orthogonally to each other after striking the second grating,
the sub-beams impinge on the first grating again, where they are recombined, so that a resulting signal beam then propagates toward the detection unit.

Alternatively, it may be provided according to an embodiment that:
a first object be connected to a first grating which functions as a scale and is configured as a reflection phase grating or as a transmission phase grating,
a second object be connected to a scanning unit, the scanning unit including the following components:
a light source
a second grating which functions as a scanning grating and further acts as a polarization grating and which is configured as a reflection phase grating,
a detection unit,
a beam emitted from the light source being split at the first grating into two sub-beams,
the sub-beams subsequently striking the second grating, where each of the two sub-beams experiences a change in direction, and the sub-beams being polarized orthogonally to each other after striking the second grating,
the sub-beams impinge on the first grating again, where they are recombined, so that a resulting signal beam then propagates toward the detection unit.

With the measures of embodiments of the invention, it is now possible to produce optical position-measuring devices that do not require separate polarization-optical components in the scanning beam path for polarization-encoded generation of phase-shifted scanning signals. The desired polarization-optical effects on the signal-generating sub-beams can be produced using a grating which, in addition to its normal function in the scanning beam path, functions as a polarization grating. This allows a particularly compact design for the corresponding position-measuring devices.

Compared to the above-discussed variants for generating polarization-encoded scanning signals without separate polarization-optical components, the approach of embodiments of the invention is not subject to constraints such as are encountered in those variants with respect to the angle of incidence of a beam to be split, for example. Also, in contrast to these approaches, the signal quality does not deteriorate under variations in the scanning distance. In the approach of embodiments of the invention, the generation of defined polarization states in the sub-beams used for signal acquisition is generally independent of the particular scanning distance.

The measures of embodiments of the invention now make it possible to generate polarization-encoded scanning signals also in optical position-measuring devices in which the split sub-beams do not propagate in a spatially completely separate relationship to one another. This would be impossible to accomplish in a conventional way because, here, no polarization-optical components can be disposed in the overlapping beams in the scanning beam path.

Furthermore, embodiments invention are able to eliminate the restriction to the very small grating periods required for beam deflection when so-called high-frequency gratings are used as polarization gratings in accordance with the prior art.

Figure 2:
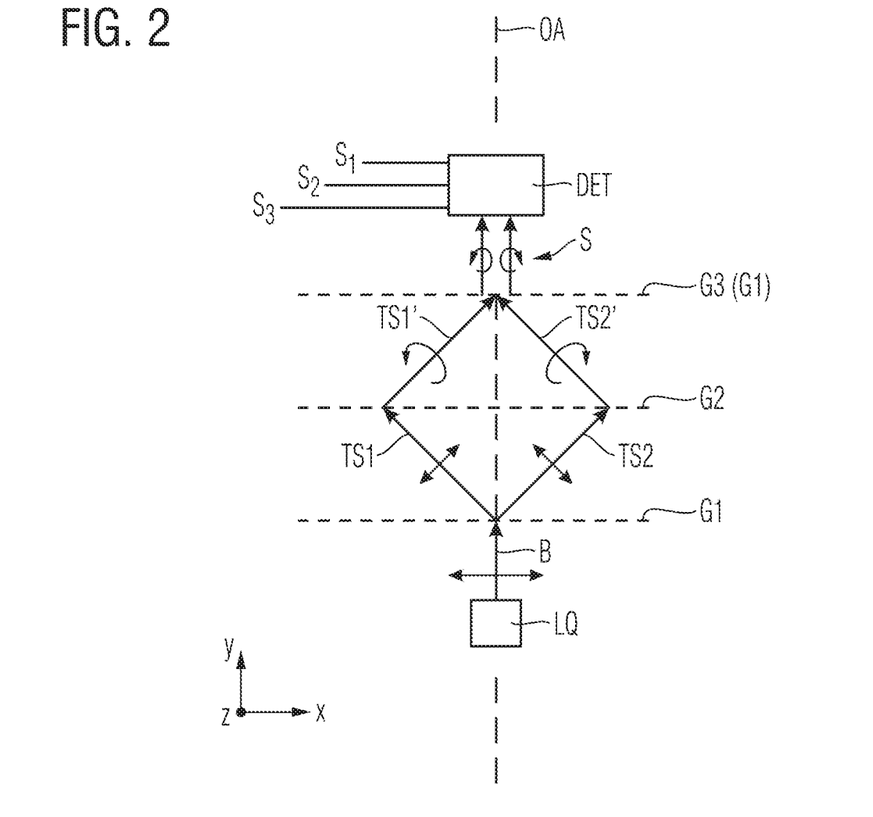
FIG. 2 is a view illustrating the unfolded scanning beam path in an exemplary embodiment of the inventive optical position-measuring device in the form of what is known as a three-grating encoder.
Figure 3A:
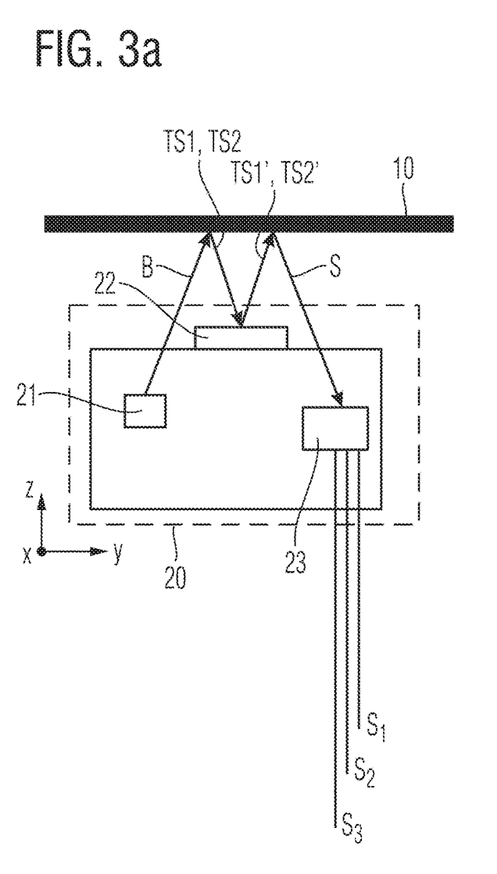
FIGS. 3a, 3b are side views of an exemplary embodiment of an inventive optical position-measuring device in the form of a three-grating encoder.
Figure 3B:
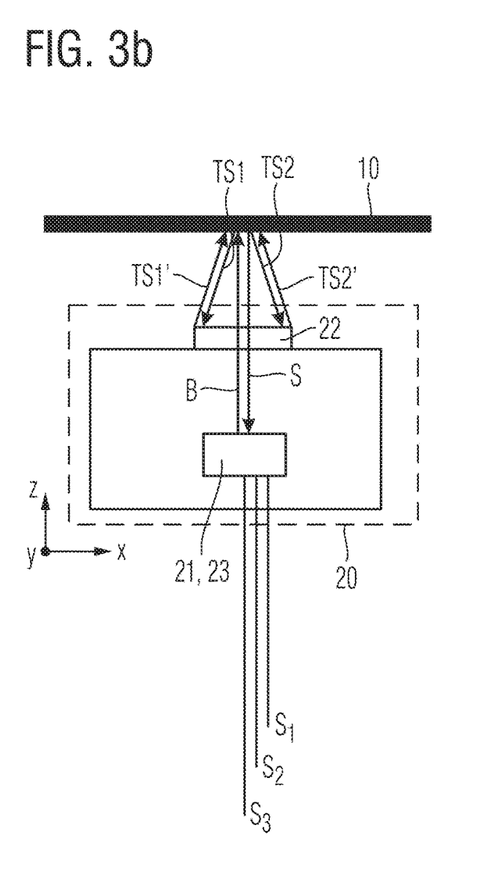
Figure 4:
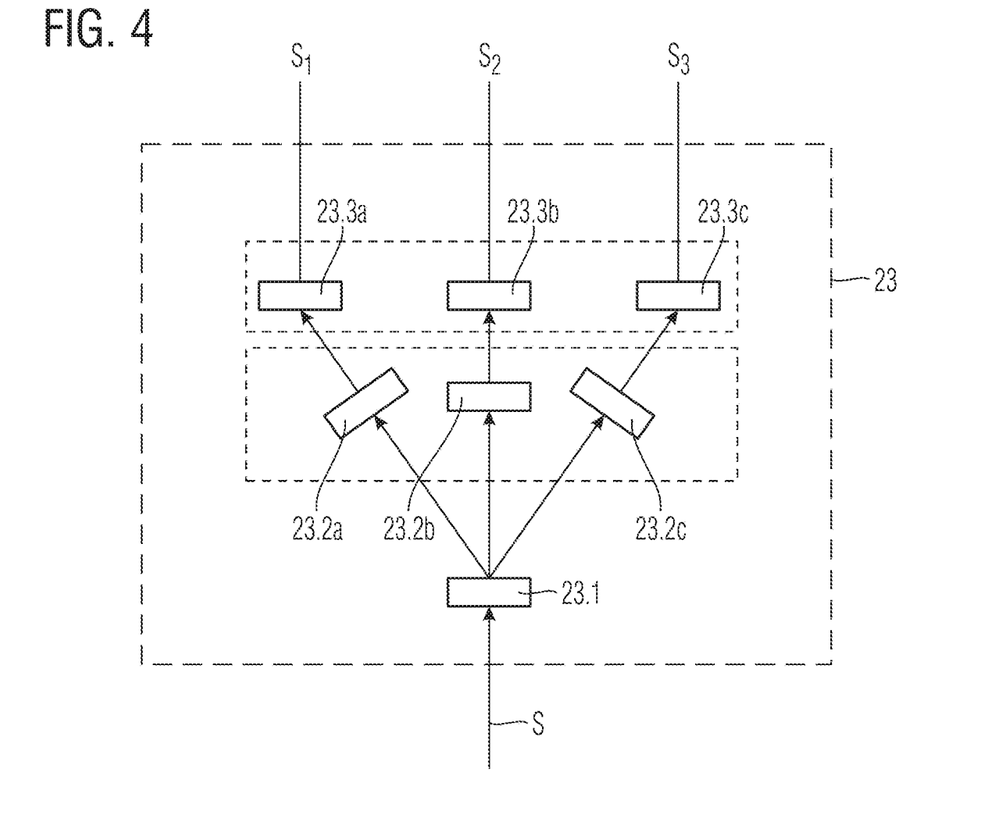
FIG. 4 is a schematic view of the detection unit of the exemplary embodiment of FIGS. 3a, 3b.
Figure 5:
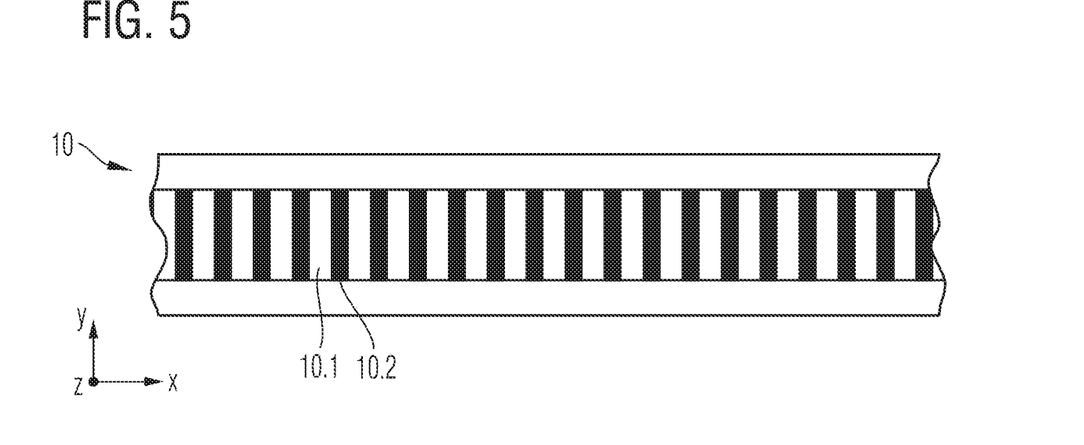
FIG. 5 is a plan view of the first grating of the exemplary embodiment of FIGS. 3a, 3b, which grating functions as a scale.
Figure 6A:
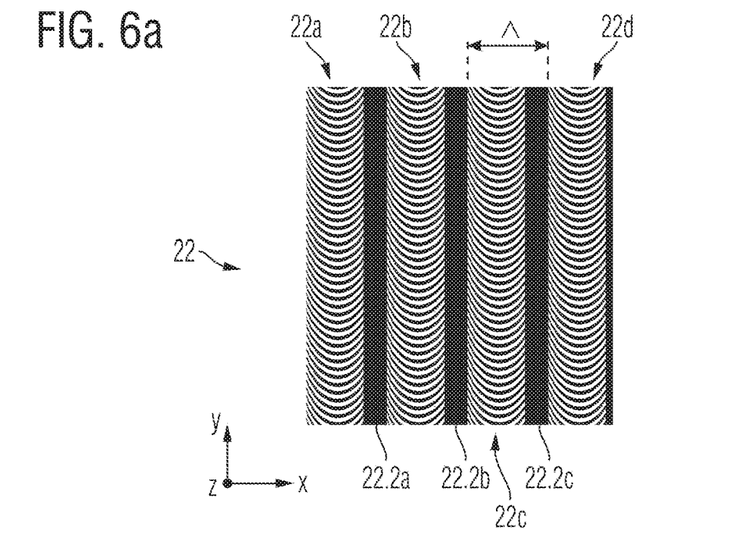
FIG. 6a is a partial plan view of the second grating of the exemplary embodiment of FIGS. 3a, 3b, which grating functions as a polarization grating.
Figure 6B:
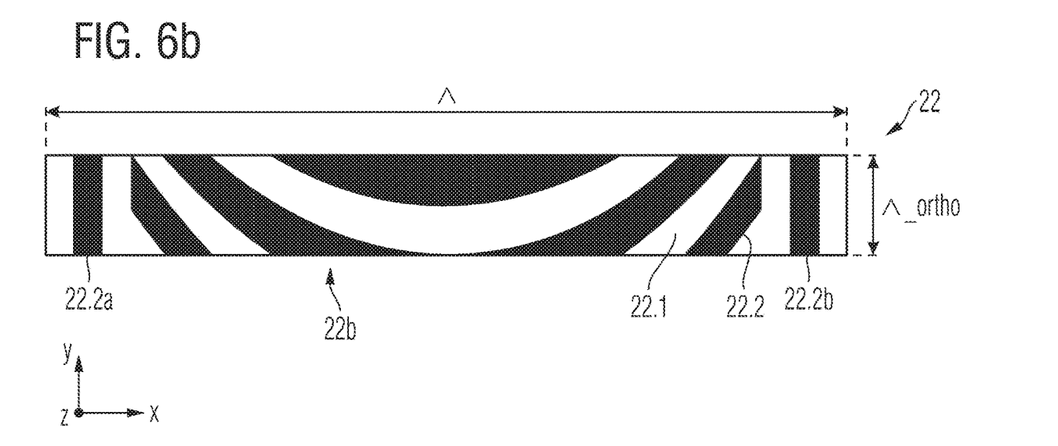
Figure 6C:
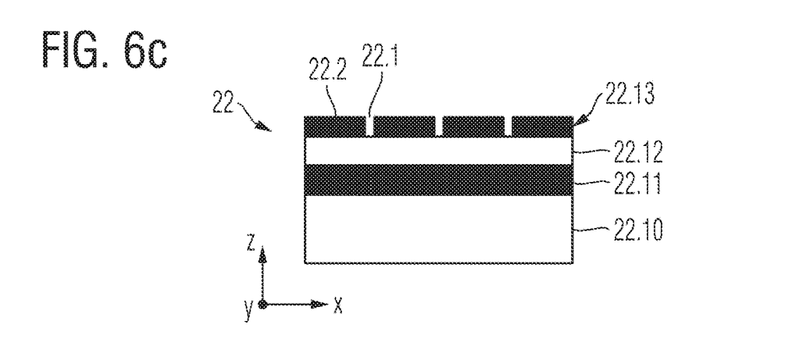

An exemplary embodiment of an optical position-measuring device according to the invention will now be described with reference to FIGS. 2-6c. This optical position-measuring device is configured as what is known as a three-grating encoder, the unfolded scanning beam path of which is illustrated in FIG. 2. FIGS. 3a, 3b show different cross-sectional views of a specific exemplary embodiment of such a three-grating encoder, and a detection unit thereof is shown in FIG. 4. FIG. 5 shows a plan view of the scale used, and FIGS. 6a-6c show different views of the polarization grating used in this example.

The corresponding position-measuring device serves to sense the relative position of two objects which are movable relative to one another along at least one measurement direction x. The relatively movable objects may be, for example, machine components which are movable relative to each other along a linear measurement direction x. The scanning signals generated by the position-measuring device with respect to the relative position of the machine components are transferred to a control unit, which may use the same for motion control.

In general, a first object is connected to a first grating of the position-measuring device, and a second object is connected to a second grating. At one of the gratings, an illumination beam emitted from a light source is split into at least two sub-beams. In the further scanning beam path, the sub-beams experience different polarization-optical effects and are finally recombined into a resulting signal beam at a grating. In a detection unit, a plurality of phase-shifted, displacement- or position-dependent scanning signals can then be generated from the signal beam. No separate polarization-optical components are disposed in the scanning beam paths of the sub-beams between splitting and recombination. Rather, at least one of the traversed gratings functions as a polarization grating for producing the different polarization-optical effects on the sub-beams. The polarization grating is configured such that diffraction orders with different polarization states are produced at each point of incidence on the grating. By suitable design of the polarization grating and selection of appropriate grating parameters, it is generally possible to generate a wide variety of different polarization states in the diffracted sub-beams. This means that the diffracted sub-beams may be linearly, elliptically, or circularly polarized. If an illumination beam is split into sub-beams with different polarization states, it is further advantageous for the split sub-beams in the scanning beam path to be polarized orthogonally to each other. In the case of linear polarization, this means that the polarization planes in the split sub-beams are oriented perpendicular to one another. In the case of circular or elliptical polarization, the term "orthogonal polarization" means that the polarization orientations in the sub-beams are opposed.

The specific design of suitable polarization gratings and possible embodiments thereof will be described in detail in the course of the following description.

In the three-grating encoder according to the first embodiment, whose unfolded scanning beam path with the beams used for signal generation is shown in FIG. 2, illumination beam B emitted from light source LQ reaches a first grid G1 by which it is split into two sub-beams TS1, TS2, each of which propagates away from optical axis OA. Illumination beam B is linearly polarized, as indicated by the double-headed arrow. The two sub-beams TS1, TS2 split by first grating G1 initially have the same polarization. In the further scanning beam path, the two sub-beams TS1, TS2 then strike a second grating G2 which, in this example, functions as a polarization grating. Second grating G2 diffracts sub-beams TS1, TS2 and changes the direction thereof, so that they then propagate further as sub-beams TS1', TS2', each in a direction toward optical axis OA. In addition to changing the direction, second grating G2, which serves as a polarization grating, causes the diffracted sub-beams TS1', TS2' to have different polarization states and to be polarized orthogonally to each other after they have passed through or impinged on grating G2. As mentioned earlier herein, sub-beams TS1', TS2' may generally be orthogonally linearly polarized, orthogonally elliptically polarized, or orthogonally circularly polarized. In the example shown, it is provided for the two sub-beams TS1', TS2' to be orthogonally circularly polarized. At third grating G3, the sub-beams, sub-beams TS1', TS2' are then finally recombined, and a signal beam S containing superimposed sub-beams TS1', TS2' of different polarization propagates further toward a detection unit DET by which the plurality of phase-shifted scanning signals $S_1$, $S_2$, $S_3$ is generated from signal beam S. A possible embodiment of a suitable detection unit DET will be described in detail in the course of the following description.

FIGS. 3a, 3b show different cross-sectional views illustrating a specific embodiment of such a three-grating encoder, configured as a reflected-light system. As can be seen from these views, the first grating encountered by illumination beam B in the scanning beam path functions as a scale 10. Here, the scale is configured as a reflection phase grating having graduation regions 10.1, 10.2 which are arranged periodically along measurement direction x and have different phase-shifting effects. A plan view of the scale 10 is shown in FIG. 5. Scale 10 is connected to a first object.

As can be seen from FIGS. 3a, 3b, illumination beam B is split into two sub-beams TS1, TS2 by the first grating; i.e., scale 10. There are other diffraction orders which result from the diffraction and splitting of illumination beam B at the first grating, but these are not used for signal generation.

In the present exemplary embodiment, all other components of the position-measuring device according to the invention are disposed in a scanning unit 20, which is connected to the second object. The two objects, and thus scale 10 and scanning unit 20 are linearly movable relative to one another along the indicated measurement direction x.

In addition to light source 21 and detection unit 21, scanning unit 20 includes the second grating encountered in the scanning beam path. In this exemplary embodiment, the second grating is also referred to as scanning grating 22 and is here configured as a reflection phase grating. In the optical position-measuring device shown, scanning grating 22 functions as a polarization grating and, in addition to diffracting and changing the direction of the linearly polarized sub-beams TS1, TS2 incident thereon, causes the diffracted sub-beams TS1', TS2' to be polarized orthogonally to each other after striking scanning grating 22. In the example shown, provision is made for sub-beams TS1', TS2' to be diffracted and reflected back in the direction of incidence in the xz plane of FIG. 3b. This means that sub-beams TS1, TS2 incident from scale 10 impinge on scanning grating 22 at the so-called Littrow angle in the xz plane, and thus, are reflected back to scale 10 as sub-beams TS1', TS2' at the same angle in the xz-plane. Thus, in this exemplary embodiment, scale 10, when hit for the second time, serves as the third grating in the scanning beam path. At scale 10, sub-beams TS1', TS2' incident from scanning grating 22 are recombined, so that a signal beam S then propagates toward detection unit 23. Detection unit 23 converts signal beam S into three position-dependent scanning signals $S_1$, $S_2$, $S_3$ which are phase-shifted by 120° with respect to each other, and which are then transferred to, for example, a downstream control unit for further processing. Alternatively, it would, of course, also be possible to generate four position-dependent scanning signals which are phase-shifted by 90° with respect to each other.

A possible embodiment of a suitable detection unit 23 is shown in schematic form in FIG. 4. It can be seen that in detection unit 23, the signal beam S containing superimposed sub-beams TS1', TS2', which is incident from the third traversed grating in the scanning beam path, i.e., from the scale, first reaches a splitter grating 23.1, which splits signal beam S into three identical sub-beams. The split sub-beams then pass through three polarizers 23.2a, 23.2b, 23.2c, whose polarization directions are rotated by 60° relative to each other. Using optoelectronic detectors 23.3a, 23.3b, 23.3c disposed downstream of polarizers 23.2a, 23.2b, 23.2c, the three sub-beams can subsequently be converted into scanning signals $S_1$, $S_2$, $S_3$ which are phase-shifted by 120° relative to each other, and which are made available for further processing.

An exemplary embodiment of a polarization grating, such as may be used, for example, in the optical position-measuring device of FIGS. 2-5 as the second grating or scanning grating 22 encountered in the scanning beam path, will now be described in detail with reference to FIGS. 6a-6c. In the following description, the polarization grating will be denoted by the same reference numeral 22 that has been used for the scanning grating in the preceding description.

As described earlier herein, polarization grating 22 is used in the inventive optical position-measuring device to produce defined polarization-optical effects on the split sub-beams at each point of incidence on the grating, so that diffraction orders with different polarization states are produced. This avoids the provision of additional, separate polarization-optical components in the scanning beam path. Furthermore, the use of such polarization gratings now allows polarization-optical generation of phase-shifted scanning signals to be implemented also in three-grating encoders according to FIG. 2. In such systems, the distances between the gratings are typically small, and therefore, there is typically no spatial separation between the split sub-beams in the region of the second illuminated grating; i.e., the split sub-beams overlap in the region of the second grating. Thus, because of the beam overlap, it would not be possible to implement polarization-optical generation of phase-shifted scanning signals in a conventional way; i.e., using polarization-optical components in the sub-beams.

In the optical position-measuring device according to the invention, the respective polarization grating 22 is configured such that diffraction orders with different polarization states are produced at each point of incidence on the grating. Preferably, polarization grating 22 is configured such that the resulting +/−1$^{st}$ diffraction orders are polarized orthogonally to each other.

As can be seen from the partial plan view of FIG. 6a, which shows an exemplary embodiment of a suitable polarization grating 22, and especially from the detail view of FIG. 6b, which shows the unit cell of such a polarization grating, polarization grating 22 includes a plurality of arcuately curved grating structures in the form of grating spaces 22.1 and grating lines 22.2.

In the present exemplary embodiment, polarization grating 22 is configured as a reflection phase grating. This means that alternately arranged grating structures; i.e., grating spaces 22.1 and grating lines 22.2, have different reflective properties, in particular different phase-shifting effects on the incident sub-beams.

As can be seen from FIGS. 6a, 6b, the direction of longitudinal extent of each of the grating structures; i.e., of each of grating spaces 22.1 and grating lines 22.2, is oriented parallel to measurement direction x. Moreover, the grating structures are arranged periodically both along measurement direction x and perpendicularly to measurement direction x. In this connection, a plurality of grating sections 22a, 22b, 22c, 22d arranged periodically with a periodicity A in the measurement direction are provided along or parallel to measurement direction x, the direction of longitudinal extent of the grating sections being oriented perpendicularly to measurement direction x; i.e., in the indicated y-direction. Within the respective grating sections 22a, 22b, 22c, 22d, the arcuate grating structures are arranged periodically with an orthogonal periodicity Λ_ortho. It is particularly advantageous if the orthogonal periodicity Λ_ortho in polarization grating 22 is selected according to the following relationship 1):

$$\Lambda\_ortho < 1.5 \cdot \lambda \quad \text{(equation 1)}$$

where
Λ_ortho:=orthogonal periodicity of the grating structures in the polarization grating
λ:=wavelength of the light source used.

By observing the relationship 1), it can be ensured that the respective polarization grating 22 will only have a small diffraction effect on the incident sub-beams in the orthogonal direction with respect to the main diffraction direction. Here, the main diffraction direction lies in the xz-plane; the diffraction direction orthogonal thereto in the yz plane. In this exemplary embodiment, the diffraction in the xz-plane is decisive for the generation of the displacement-dependent scanning signals; a strong diffraction effect along other planes would otherwise result in a decrease in the signal intensity and in the polarization effect.

For a given coordinate system according to FIGS. 6a, 6b, the curved grating structures; i.e., grating spaces 22.1 and grating lines 22.2, of polarization grating 22 can, for example, be described analytically by one of the following relationships 2a), 2b):

$$Y = (\Lambda/\pi) \cdot \ln(|1/\cos(x \cdot \pi/\Lambda)|) \quad \text{(equation 2a)}$$

where
Λ:=periodicity of the grate sections in the measurement direction
X:=measurement direction
Y:=direction of longitudinal extent of the grating sections $$Y = \text{sqrt}((\Lambda/2)^2 - x^2) \quad \text{(equation 2b)}$$

where
Λ:=periodicity of the grate sections in the measurement direction
X:=measurement direction
Y:=direction of longitudinal extent of the grating sections The relationship 2a) characterizes a catenary-shaped grating structure; the relationship 2b) characterizes a circular-line-shaped grating structure.

As can be seen in particular from FIG. 6a, in the exemplary embodiment shown, straight grating lines 22.2a, 22.2b, 22.2c are disposed in the x-direction between respective adjacent grating sections 22a, 22b, 22c, 22d. Straight grating lines 22.2a, 22.2b, 22.2c have an elongated rectangular shape, the longitudinal axis of the rectangle extending perpendicularly to measurement direction x; i.e., along direction y.

Alternatively, it may also be provided that grating spaces or a plurality of alternating adjacent grating lines and grating spaces be disposed between adjacent grating sections 22a, 22b, 22c, 22d. Further, it is also possible that no separate grating spaces nor grating lines are disposed in these regions but that, rather, the grating structures of adjacent grating sections 22a, 22b, 22c, 22d adjoin one another.

It is also advantageous if the area fill ratio FV of polarization grating 22 is selected according to the following relationship 3):

$$FV < 0.6 \quad \text{(equation 3)}$$

where
FV:=ratio of the area of the grating lines within a polarization grating unit cell to the overall area of the polarization grating unit cell.

Polarization gratings dimensioned in this way are easier to clean. This also ensures that the various grating structures are sufficiently separated from one another, which makes it possible to avoid undesirable coupling effects between adjacent grating structures, which would otherwise lead to a decrease in the intensities in the +/−1$^{st}$ diffraction orders.

In connection with the specific design of polarization grating 22 and appropriate materials for such gratings, reference is made to the illustration in FIG. 6c, which shows a partial cross-sectional view in the xz plane of the polarization grating 22 of FIGS. 6a, 6b. As already mentioned above, this exemplary embodiment of a polarization grating 22 takes the form of a reflection phase grating. The reflection phase grating includes a carrier substrate 22.10 on which is disposed a planar reflective layer 22.11. In this example, moreover, a planar phase-shifting layer 22.12 is provided above reflective layer 22.11. Disposed on the phase-shifting layer is grating structure layer 22.13, in which the grating structures, including the respective grating lines 22.2 and grating spaces 22.1, are formed in the above-described geometry; i.e., in the arrangement described.

For a polarization grating 22 having such a design, it is advantageous if grating structure layer 22.13 has a layer thickness d selected according to the following relationship 4):

$$d < 0.6 \cdot \lambda \quad \text{(equation 4)}$$

where d:=layer thickness of the grating structure layer
λ:=wavelength of the light source used.

In this exemplary embodiment, quartz glass or Zerodur, for example, may be used as a carrier substrate 22.10 for polarization grating 22.

Reflective layer 22.11 may take the form of a metallic reflective layer or a reflecting layer stack composed of a plurality of layers of high- and low-refractive-index materials such as, for example, of $TaO_x$, $TiO_2$, Si as a high-refraction-index materials and, for example, $SiO_2$ as a low-refractive-index material. An example of a material that may be used for phase-shifting layer 22.12 is $SiO_2$.

With regard to the design of grating structure layer 22.13, it may be provided to use a dielectric material from the group consisting of $SiO_2$, $TaO_x$, $TiO_2$, Si. However, it is also possible to use a semiconductor material such as TiN or GaN or metals with high conductivity such as Al, Ag, Au. Alternatively, the grating structure layer 22.13 may also be composed of a layer stack in which one or more of the aforementioned dielectric materials or semiconductor materials are used.

In another alternative embodiment, the polarization grating in the form of a reflection phase grating may include only a carrier substrate having a reflective layer disposed thereon, and a patterned phase-shifting layer disposed thereabove. In this case, the separate phase-shifting and grating structure layers provided in the example of FIG. 6c would be combined into a single layer, namely in the form of one or more patterned layer(s) disposed directly on the reflective layer without an additional phase-shifting layer.

In order to achieve the desired polarization effect for the respective polarization grating, it is, of course, also necessary to select suitably adapted materials in addition to the specific geometry and arrangement of the grating structures and the grating parameters structure width and etch depth.

FIGS. 7a-7e are views of unit cells of alternative embodiments of polarization gratings, which may be used in the optical position-measuring device according to the invention.

Figure 7A:
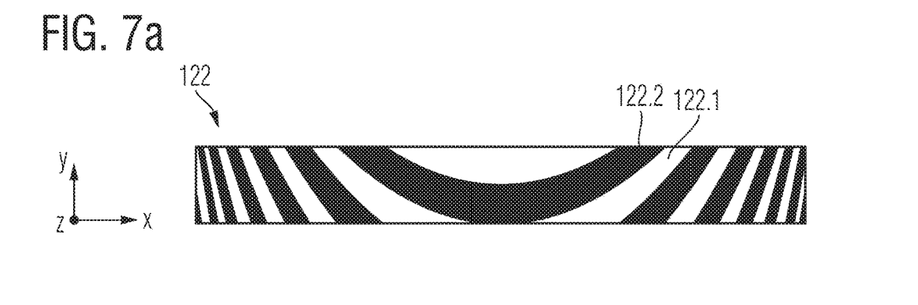
FIGS. 7a-7e are detail views of the unit cell of alternative embodiments of polarization gratings.

FIG. 7a shows a variant of a polarization grating 122 where the grating structures in the form of grating spaces 122.1 and grating lines 122.2 are catenary-shaped and each extend in the x-direction to the edge of the unit cell. These grating structures can, for example, be analytically characterized by the above relationship 2a).

Figure 7B:
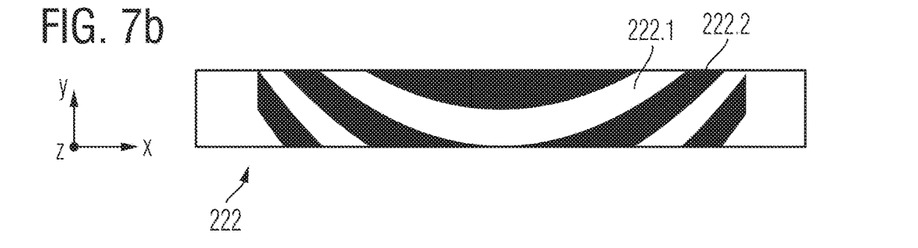

FIG. 7b shows a unit cell of another polarization grating 222 where the arcuate grating structures; i.e., grating spaces 222.1 and grating lines 222.2, are circular-line-shaped and cut in the x-direction at the edges of the unit cell.

Figure 7C:
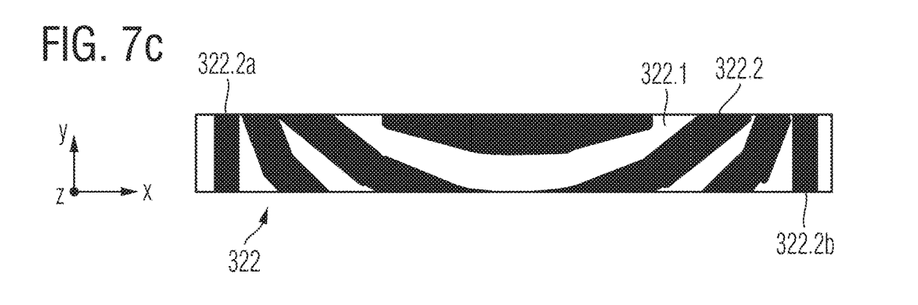

In the unit cell of a polarization grating 322 shown in FIG. 7c, the catenary-shaped grating structures; i.e., grating spaces 322.1 and 322.2 grating lines, are made up of discrete linear sections.

Figure 7D:
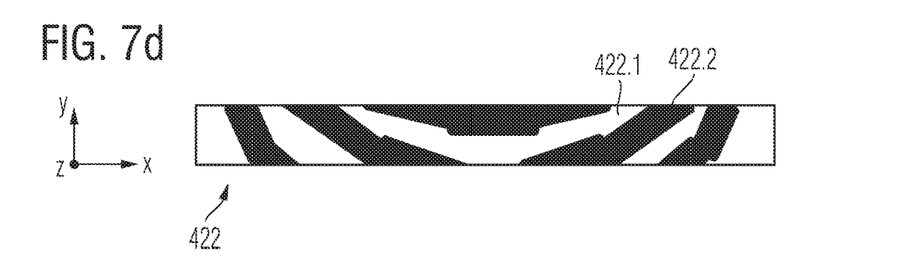

A slightly modified variant of the unit cell of a polarization grating 422 of the exemplary embodiment shown in FIG. 7c is finally illustrated in FIG. 7d. In this polarization grating 422, the adjacent linear sections of the grating structures; i.e., of grating spaces 422.1 and grating lines 422.2, additionally have an offset.

Figure 7E:
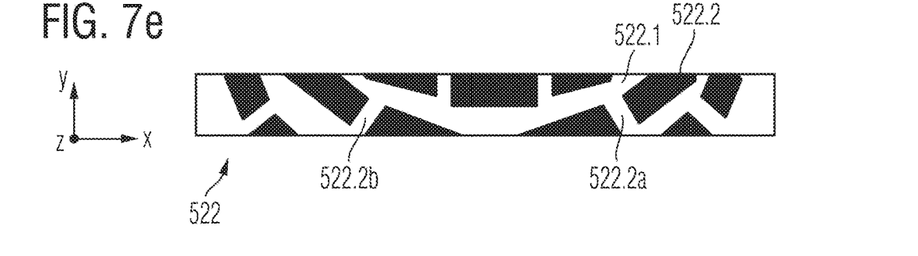

Another variant of a unit cell of polarization grating 522 is finally shown in FIG. 7e. In this example, the arcuate grating structures in the form of grating spaces 522.1 and grating lines 522 are partially interrupted. Thus, for example, the central grating line 522.2 in the unit cell has two breaks 522.2a, 522.2b.

The variants shown in FIGS. 7b-7e prove to be particularly advantageous because they are easier to manufacture; grating regions with extremely fine patterns can be avoided in these embodiments.

In addition to the exemplary embodiments specifically described herein, other embodiments are, of course, possible within the scope of the present invention.

For example, the optical position-measuring device according to the invention may also be configured for sensing relative rotary movements between two objects.

Furthermore, in the case of an embodiment as a three-grating encoder, the first grating in the form of the scale and the second grating in the form of the scanning grating or polarization grating do not necessarily have to be configured as reflective gratings. For example, the first grating may, of course, also be configured as a transmission phase grating, and the second grating may likewise be configured as a transmission phase grating. Also possible are mixed design variants including reflection and transmission phase gratings, such as, for example, a transmissive scanning or polarization grating and a reflective scale, or a transmissive scale and a reflective polarization grating, etc.

If the polarization grating is configured as a transmissive-type phase grating, then this transmission phase grating may include, for example, a transparent carrier substrate into which the grating structures are etched. Alternatively, it is also possible to apply to the transparent carrier substrate a separate grating structure layer of dielectric material or semiconductor material, in which the respective grating structures are formed. In this case, again, the grating structure layer may also be composed of a suitable layer stack.

Besides the described scanning in accordance with a three-grating scanning principle, it is of course also possible to provide other scanning beam paths in the optical position-measuring device according to the invention. For example, in so-called strip encoders, such as are described, for example, in WO 2008/138501 A1 and EP 2450672 A2, one of the gratings may be configured as a polarization grating to thereby enable polarization-optical generation of phase-shifted scanning signals. It is then no longer necessary to provide additional or separate polarization-optical components. In such systems, the first grating may be configured as a reflection phase grating or as a transmission phase grating, and the second grating may be configured as a reflection phase grating, the second grating functioning as a polarization grating.

Alternatively, however, any of the illuminated gratings may generally be used as a polarization grating, both in the case of this scanning principle and in the case of other optical scanning principles.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device for sensing a relative position of two objects which are movable relative to one another along at least one measurement direction, the optical position-measuring device comprising:
a first grating configured to be connected to the first object and a second grating configured to be connected to the second object,
wherein the optical position-measuring device is configured such that, at one of the gratings, an illumination beam emitted from a light source is split into at least two sub-beams which, in respective scanning beam paths following the splitting, experience different polarization-optical effects and recombine at one of the gratings, wherein after the differently polarized sub-beams are recombined, a plurality of phase-shifted, displacement-dependent scanning signals are generatable from a resulting signal beam,
wherein no separate polarization-optical components are disposed in the scanning beam paths of the at least two sub-beams between splitting and recombination,
wherein at least one of the gratings is configured as a polarization grating configured to produce the different polarization-optical effects on the at least two sub-beams, and
wherein the polarization grating is configured such that diffraction orders with different polarization states are produced independent of location on the polarization grating.

2. The optical position-measuring device as recited in claim 1, wherein an area fill ratio FV of the polarization grating is selected according to the relation FV<0.6, where the area fill ratio FV is defined as a ratio of an area of the grating lines within a polarization grating unit cell to an overall area of the polarization grating unit cell.

3. The optical position-measuring device as recited in claim 1, wherein the polarization grating is configured such that resulting +/− $1^{st}$ diffraction orders are polarized orthogonally to each other.

4. The optical position-measuring device as recited in claim 1, wherein:

the first object is connected to the first grating which is configured as a reflection phase grating or as a transmission phase grating,
the second object is connected to the second grating which is configured to function as the polarization grating and is configured as a reflection phase grating,
the illumination beam emitted from the light source is split at the first grating into the at least two sub-beams which subsequently strike the second grating, where each of the at least two sub-beams experiences diffraction and a change in direction, the at least two sub-beams being polarized orthogonally to each other after striking the second grating, and
the at least two sub-beams impinge on the first grating again, where the at least two sub-beams are recombined, so that a resulting signal beam then propagates toward a detector.

5. The optical position-measuring device as recited in claim 1, wherein:

the first object is connected to the first grating which functions as a scale and is configured as a reflection phase grating or as a transmission phase grating,
the second object is connected to a scanning unit, the scanning unit including the following components:
the light source,
the second grating which is configured to function as a scanning grating and as the polarization grating and which is configured as a reflection phase grating, and
a detector,
wherein:
the illumination beam emitted from the light source is split at the first grating into the at least two sub-beams,
the at least two sub-beams subsequently strike the second grating, where each of the at least two sub-beams experiences a change in direction, the at least two sub-beams being polarized orthogonally to each other after striking the second grating, and
the at least two sub-beams impinge on the first grating again, where the at least two sub-beams are recombined, so that a resulting signal beam then propagates toward the detector.

6. The optical position-measuring device as recited in claim 1, wherein the polarization grating includes a plurality of arcuately curved grating structures in the form of grating lines and grating spaces, a direction of longitudinal extent of each of these grating structures being oriented parallel to the measurement direction, and the grating structures being arranged periodically both along the measurement direction and perpendicularly to the measurement direction.

7. The optical position-measuring device as recited in claim 6, wherein the polarization grating has strip-shaped grating sections periodically arranged parallel to the measurement direction with a periodicity in the measurement direction, a direction of longitudinal extent of the grating sections being oriented perpendicularly to the measurement direction, the grating structures within the grating sections being periodically arranged perpendicularly to the measurement direction with an orthogonal periodicity $\Lambda\_ortho$.

8. The optical position-measuring device as recited in claim 6, wherein between adjacent grating sections of the polarization grating, there is disposed at least one of:
a grating space,
a grating line, or
a plurality of alternating adjacent grating lines and grating spaces.

9. The optical position-measuring device as recited in claim 6, wherein grating structures of adjacent grating sections adjoin one another.

10. The optical position-measuring device as recited in claim 7, wherein the orthogonal periodicity $\Lambda\_ortho$ is selected according to the relation $\Lambda\_ortho < 1.5 \cdot \lambda$, where $\lambda$ is the wavelength of the light source used.

11. The optical position-measuring device as recited in claim 1, wherein the polarization grating is configured as a reflection phase grating having grating lines and grating spaces with different reflective properties.

12. The optical position-measuring device as recited in claim 11, wherein the reflection phase grating includes:
a carrier substrate,
a planar reflective layer disposed on the carrier substrate, and
a grating structure layer disposed above the reflective layer.

13. The optical position-measuring device as recited in claim 12, wherein the grating structure layer has a layer thickness d selected according to the relation $d < 0.6 \cdot \lambda$, where $\lambda$ is the wavelength of the light source used.

14. The optical position-measuring device as recited in claim 12, wherein a planar phase-shifting layer is disposed between the planar reflective layer and the grating structure layer.

15. The optical position-measuring device as recited in claim 12, wherein:
the reflective layer is composed of a metallic reflective layer or of a reflective layer stack, and
the grating structure layer is composed of a dielectric material selected from the group consisting of $SiO_2$, $TaO_x$, $TiO_2$ and Si, or of a semiconductor material selected from the group consisting of TiN and GaN, or of a layer stack including one or more of the dielectric materials and one or more of the semiconductor materials.

16. An optical position-measuring device for sensing a relative position of two objects which are movable relative to one another along at least one measurement direction, the optical position-measuring device comprising:
a first grating configured to be connected to the first object and a second grating configured to be connected to the second object,
wherein the optical position-measuring device is configured such that, at one of the gratings, an illumination beam emitted from a light source is split into at least two sub-beams which, in respective scanning beam paths following the splitting, experience different polarization-optical effects and recombine at one of the gratings, wherein after the differently polarized sub-beams are recombined, a plurality of phase-shifted, displacement-dependent scanning signals are generatable from a resulting signal beam,
wherein no separate polarization-optical components are disposed in the scanning beam paths of the at least two sub-beams between splitting and recombination,
wherein at least one of the gratings is configured as a polarization grating configured to produce the different polarization-optical effects on the at least two sub-beams,
wherein the polarization grating is configured such that diffraction orders with different polarization states are produced at each point of incidence on the polarization grating, and
wherein the polarization grating includes a plurality of arcuately curved grating structures in the form of grating lines and grating spaces, a direction of longitudinal extent of each of these grating structures being oriented parallel to the measurement direction, and the grating structures being arranged periodically both along the measurement direction and perpendicularly to the measurement direction.

17. The optical position-measuring device as recited in claim 16, wherein between adjacent grating sections of the polarization grating, there is disposed at least one of:
a grating space,
a grating line, or
a plurality of alternating adjacent grating lines and grating spaces.

18. The optical position-measuring device as recited in claim 16, wherein grating structures of adjacent grating sections adjoin one another.

19. The optical position-measuring device as recited in claim 16, wherein an area fill ratio FV of the polarization grating is selected according to the relation $FV < 0.6$, where the area fill ratio FV is defined as a ratio of an area of the grating lines within a polarization grating unit cell to an overall area of the polarization grating unit cell.

20. The optical position-measuring device as recited in claim 16, wherein the polarization grating is configured such that resulting $+/- 1^{st}$ diffraction orders are polarized orthogonally to each other.

21. The optical position-measuring device as recited in claim 16, wherein:
the first object is connected to the first grating which is configured as a reflection phase grating or as a transmission phase grating,
the second object is connected to the second grating which is configured to function as the polarization grating and is configured as a reflection phase grating,
the illumination beam emitted from the light source is split at the first grating into the at least two sub-beams which subsequently strike the second grating, where each of the at least two sub-beams experiences diffraction and a change in direction, the at least two sub-beams being polarized orthogonally to each other after striking the second grating, and
the at least two sub-beams impinge on the first grating again, where the at least two sub-beams are recombined, so that a resulting signal beam then propagates toward a detector.

22. The optical position-measuring device as recited in claim 16, wherein:
the first object is connected to the first grating which functions as a scale and is configured as a reflection phase grating or as a transmission phase grating,
the second object is connected to a scanning unit, the scanning unit including the following components:
the light source,
the second grating which is configured to function as a scanning grating and as the polarization grating and which is configured as a reflection phase grating, and
a detector,
wherein:
the illumination beam emitted from the light source is split at the first grating into the at least two sub-beams,
the at least two sub-beams subsequently strike the second grating, where each of the at least two sub-beams experiences a change in direction, the at least two sub-beams being polarized orthogonally to each other after striking the second grating, and the at least two sub-beams impinge on the first grating again, where the at least two sub-beams are recombined, so that a resulting signal beam then propagates toward the detector.

23. The optical position-measuring device as recited in claim 16, wherein the polarization grating has strip-shaped grating sections periodically arranged parallel to the measurement direction with a periodicity in the measurement direction, a direction of longitudinal extent of the grating sections being oriented perpendicularly to the measurement direction, the grating structures within the grating sections being periodically arranged perpendicularly to the measurement direction with an orthogonal periodicity $\Lambda\_ortho$.

24. The optical position-measuring device as recited in claim 23, wherein the orthogonal periodicity $\Lambda\_ortho$ is selected according to the relation $\Lambda\_ortho < 1.5 \cdot \lambda$, where $\lambda$ is the wavelength of the light source used.

25. The optical position-measuring device as recited in claim 16, wherein the polarization grating is configured as a reflection phase grating, and wherein the grating lines and the grating spaces with different reflective properties.

26. The optical position-measuring device as recited in claim 25, wherein the reflection phase grating includes:
a carrier substrate,
a planar reflective layer disposed on the carrier substrate, and
a grating structure layer disposed above the reflective layer.

27. The optical position-measuring device as recited in claim 26, wherein the grating structure layer has a layer thickness d selected according to the relation $d < 0.6 \cdot \lambda$, where $\lambda$ is the wavelength of the light source used.

28. The optical position-measuring device as recited in claim 26, wherein a planar phase-shifting layer is disposed between the planar reflective layer and the grating structure layer.

29. The optical position-measuring device as recited in claim 26, wherein:
the reflective layer is composed of a metallic reflective layer or of a reflective layer stack, and
the grating structure layer is composed of a dielectric material selected from the group consisting of $SiO_2$, $TaO_x$, $TiO_2$ and Si, or of a semiconductor material selected from the group consisting of TiN and GaN, or of a layer stack including one or more of the dielectric materials and one or more of the semiconductor materials.

30. An optical position-measuring device for sensing a relative position of two objects which are movable relative to one another along at least one measurement direction, the optical position-measuring device comprising:
a first grating configured to be connected to the first object and a second grating configured to be connected to the second object,
wherein the optical position-measuring device is configured such that, at one of the gratings, an illumination beam emitted from a light source is split into at least two sub-beams which, in respective scanning beam paths following the splitting, experience different polarization-optical effects and recombine at one of the gratings, wherein after the differently polarized sub-beams are recombined, a plurality of phase-shifted, displacement-dependent scanning signals are generatable from a resulting signal beam,
wherein no separate polarization-optical components are disposed in the scanning beam paths of the at least two sub-beams between splitting and recombination,
wherein at least one of the gratings is configured as a polarization grating configured to produce the different polarization-optical effects on the at least two sub-beams,
wherein the polarization grating is configured such that diffraction orders with different polarization states are produced at each point of incidence on the polarization grating,
wherein the polarization grating is configured as a reflection phase grating having grating lines and grating spaces with different reflective properties,
wherein the reflection phase grating includes:
a carrier substrate;
a planar reflective layer disposed on the carrier substrate; and
a grating structure layer disposed above the reflective layer, and
wherein a planar phase-shifting layer is disposed between the planar reflective layer and the grating structure layer.

31. The optical position-measuring device as recited in claim 30, wherein the grating structure layer has a layer thickness d selected according to the relation $d < 0.6 \cdot \lambda$, where $\lambda$ is the wavelength of the light source used.

32. The optical position-measuring device as recited in claim 30, wherein:
the reflective layer is composed of a metallic reflective layer or of a reflective layer stack, and
the grating structure layer is composed of a dielectric material selected from the group consisting of $SiO_2$, $TaO_x$, $TiO_2$ and Si, or of a semiconductor material selected from the group consisting of TiN and GaN, or of a layer stack including one or more of the dielectric materials and one or more of the semiconductor materials.

* * * * *